United States Patent

[11] 3,588,521

| [72] | Inventor | Leslie F. Stone<br>Westchester, Ill. 60153 |
|---|---|---|
| [21] | Appl. No. | 816,219 |
| [22] | Filed | Apr. 15, 1969 |
| [45] | Patented | June 28, 1971 |

[54] LEVEL RESPONSIVE APPARATUS
5 Claims, 5 Drawing Figs.

[52] U.S. Cl..................................................... 307/118,
200/61.21, 222/64
[51] Int. Cl..................................................... H01h 35/18
[50] Field of Search........................................... 222/56, 64;
73/290, 290 (V); 62/137; 200/61.21; 307/116, 118

[56] References Cited
UNITED STATES PATENTS

| 2,533,550 | 12/1950 | Blackwell..................... | 222/56 |
| 2,680,298 | 6/1954 | Obenshain..................... | 222/56X |
| 3,282,084 | 11/1966 | Banks........................... | 73/290 |

FOREIGN PATENTS

| 222,735 | 3/1958 | Australia............ ......... | 73/290 |
| 839,092 | 6/1960 | Great Britain...... ........ | 73/290 |

*Primary Examiner*—Harvey C. Hornsby
*Assistant Examiner*—H. S. Lane
*Attorney*—John L. Hutchinson ABSTRACT: The present invention involves a device for detecting and controlling the level of finely divided or granular material discharged into a receptacle. The device includes a rod or probe extending through the walls of the receptacle into its interior. By means of electrically activated components the rod is caused to pulsate within the interior of the receptacle until such time as the level of material in the receptacle prevents its continued movement. The flow of material into the receptacle from a source of supply is, in turn, controlled by the movement of the rod or probe.

PATENTED JUN28 1971 3,588,521

INVENTOR
Leslie T. Stone

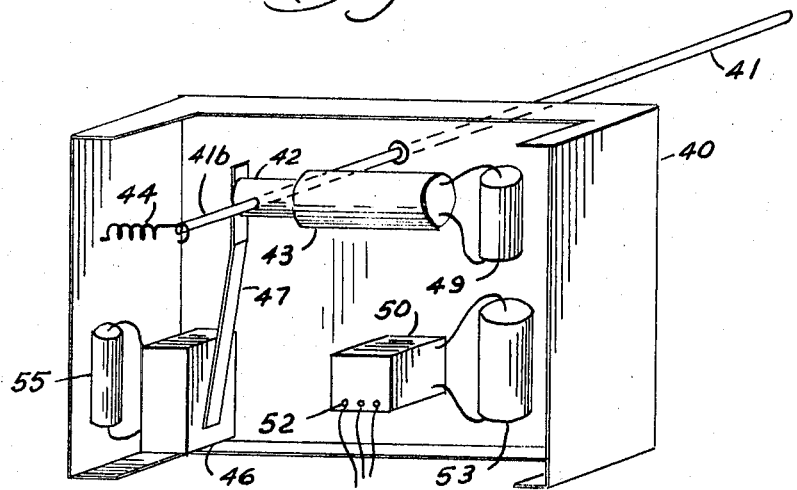
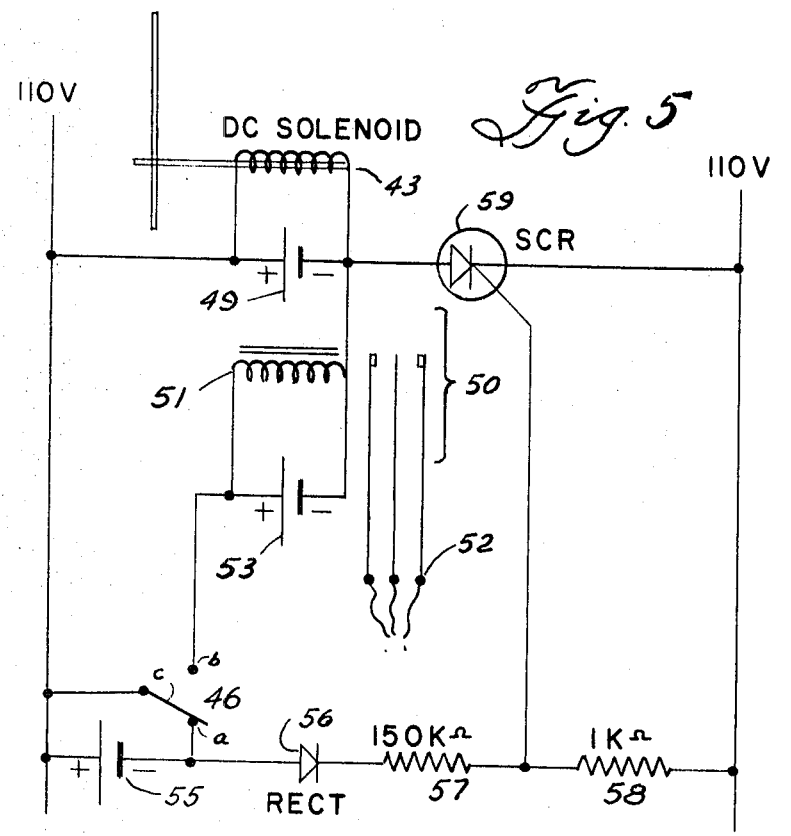

LEVEL RESPONSIVE APPARATUS

OBJECTS OF INVENTION

It is a primary object of this invention to provide a device for detecting and controlling the level of finely divided or granular material into a receptacle, which is of relatively simple and inexpensive construction and lends itself to mass assembly operations.

A further object is the provision of a device of the foregoing type which is of rugged construction, easily installed and which has a relatively long life with minimum of repairs.

In the attached drawing:

FIG. 4 is a perspective of another modification of the level control device.

FIG. 5 is a schematic diagram of an electrical circuit employed in the level control device shown in FIG. 4.

DESCRIPTION OF COMPONENTS AND ASSEMBLY

Figure 2:
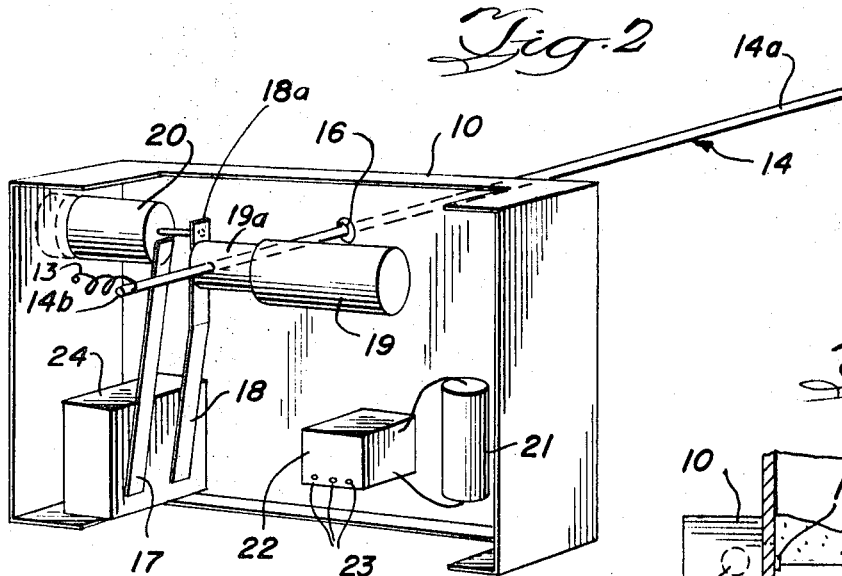
FIG. 2 is a perspective of one modification of the level control device showing the general relationship of its components.
Figure 1:
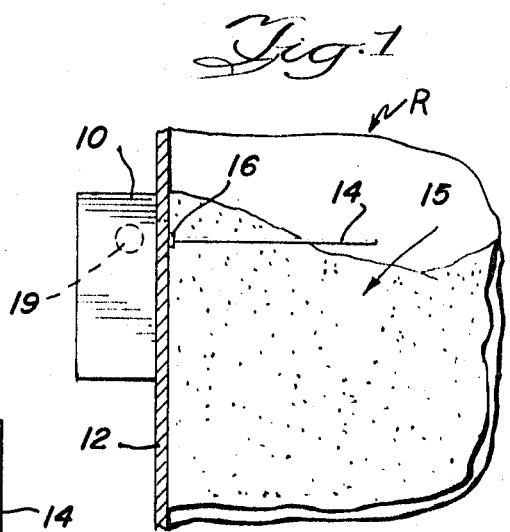
FIG. 1 represents a partial view, partly in section, of a receptacle for finely divided or granular material showing the level control device attached to the side of the receptacle.
Figure 3:
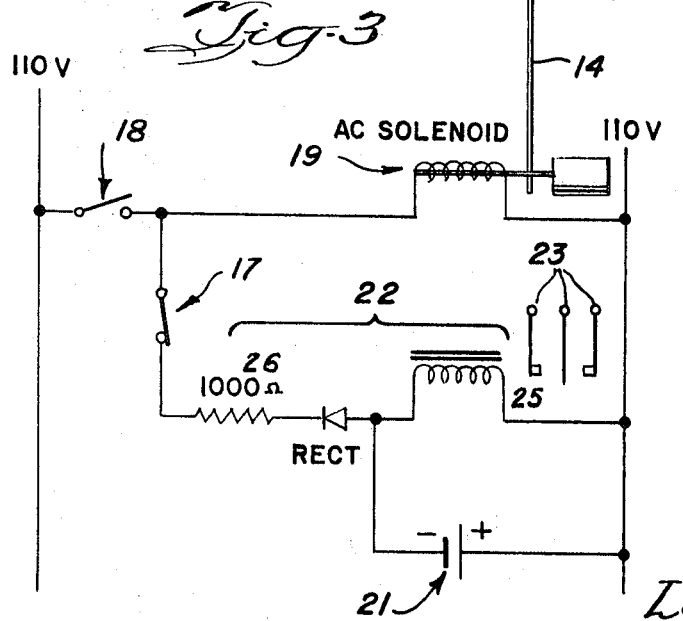
FIG. 3 is a schematic diagram of an electrical circuit which may be used in the level control device of FIG. 2 illustrating the relationship of the basic elements.

Referring initially to FIGS. 1, 2 and 3, the numeral 10 designates the housing or base of the level control device of the present invention, the device being attached to side 12 of a receptacle R such as a storage bin. Extending from the level control device through the wall of its housing and also the wall 12 of the receptacle R is an elongated rod or probe 14. The rod 14 is adapted to control the level of finely divided or granular material 15 disposed in the receptacle, as shown in FIG. 1. Typical material with which the device may be used are coal dust, wheat, sand and gravel, which may be discharged from a suitable source and stored in the receptacle. Rod 14 is preferably made of stainless steel, about one-eighth inch in diameter and may vary from about 8 to 20 inches in length, depending upon use. However, the actual configuration of the rod is not critical other than that it is an elongated element of rather limited weight and cross-sectional dimension. For purposes of describing the relationship of the rod to the other components, the section of the rod projecting outwardly from housing 10 is designated 14a and that section extending inwardly is designated 14b. A spring 13 is connected to rod section 14b and the wall of the housing 10 to control movement of the rod, as further described hereinafter.

A grommet or rubber bushing 16 surrounds the rod 14 as it passes through the wall of the housing 10 providing a seal to prevent inadvertent entrance of finely divided material into the housing of the level control device. Section 14b of rod 14 is adapted to contact switch arm 17 so as to control its operation in accordance with the description below.

A pulsating movement is imparted to rod 14 by means of solenoid 19 in combination with other components, in that rod section 14b is connected to the reciprocating armature 19a of the solenoid. In the embodiment illustrated in FIG. 2 the rod is connected to armature 19a by passing through an aperture located in the outer end of the armature. Activation of the solenoid 19 will, accordingly, cause the rod to move and pivot about the area of the bushing 16. Plunger 19a is adapted to abut against the upper end 18a of switch 18 to correspondingly control the movement of this switch. In order to assist in obtaining a pulsatinglike movement and, correspondingly, to control the activation of the plunger of the solenoid 19, an adjustable dashpot 20 is provided which is connected to the upper end 18a of switch 18.

Included as part of the electrical circuit is a capacitor 21, generally of about 1 mfd., disposed in parallel with a direct current relay 25, these two elements being in series with a rectifier and a resistance 26 as shown in FIG. 3. The capacitor, in addition to assisting in maintaining relay 25 in desired position as hereinafter described, also serves to reduce chattering of the relay. The resistance is employed primarily to limit the current of the circuit, generally to about one-tenth amp. Relay 25 controls a circuit, not shown, connected to terminals 23 used to operate the mechanism, also not shown, for conveying granular material 15 from a source of supply to the receptacle R. For convenience, relay 25, the rectifier and resistance 26 may be enclosed in a single housing 22, with terminals 23 located on the exterior of the housing. Likewise, the switches controlled by switch arms 17 and 18 are shown as being enclosed in a common housing 24, although separate switches may be mounted as desired.

The level control device may be attached to the side of receptacle R in any convenient manner at a desired height. It is generally contemplated that the attachment will require only a small opening in the side of the receptacle sufficient to permit insertion of the rod 14 into the receptacle. Although not shown, one preferred arrangement for attaching the level control device to the side of a receptacle consists of providing a slightly projecting bushing about 1 inch in external diameter with external threads in the wall of the level control device 10 through which the rod extends. A complementary threaded opening can be provided in the wall 12 of the receptacle R. The rod 14 may then be initially inserted into the threaded opening in the wall 12 and the control device moved forward until the threaded bushing surrounding the rod is in contact with the threaded opening. By turning the whole device the corresponding threads of bushing and opening are engaged until the device is securely fastened in position.

In the modification of the device shown in FIGS. 4 and 5, movement of the rod or probe is based solely on electrical controls, eliminating the use of a mechanical dashpot damper.

Referring now to the modification disclosed in FIGS. 4 and 5, the numeral 40 designates the housing of the level control device for use in detecting the level of material such as 15 in a receptacle 12, as shown in FIG. 1. The rear portion 41b of rod 41 extending into the housing may be connected to armature 42 of a solenoid 43 and spring 44 in the same manner as described for the embodiments of FIGS. 2 and 3. The armature 42 is adapted to control the movement of spring switch 46 by activation of arm 47 to which it may be permanently attached, if desired. Switch 46 includes terminals a and b and a moveable contact c.

Disposed in parallel with the coil winding of a solenoid 43 is a capacitor 49. Also provided is a relay 50 with its associated armature and coil 51 adapted to control an external circuit connected to terminals 52. A capacitor 53 is disposed in parallel with the coil winding 41.

Other elements of the circuits connected in the relationship shown in the schematic of FIG. 5 are a capacitor 55, rectifier 56, resistances 57 and 58, and a silicon control rectifier 59.

Attaching the embodiment of the invention described immediately above to a receptacle may be accomplished in the same manner as described for that of FIG. 2.

OPERATION

When the level control device of FIGS. 2 and 3 is in position on the wall 12 of the receptacle R, the rod 14 will extend into the interior of the receptacle at the desired height through an appropriate aperture in the wall 12. In the initial or starting position, spring 13 pulls section 14b to the left as shown in FIG. 2 with section 14a of rod 14 moved to the right. Also, in the initial position switch 17 is open and switch 18 is closed.

Upon connecting the circuit of the control device with a current source, solenoid 19 is energized drawing armature 19a and, correspondingly, section 14b of rod 14 to the right, removing the latter from contact with switch 17. This movement of the solenoid armature and rod causes switch 17 to close and switch 18 to open the latter after a short delay due to the damping action of the dashpot 20. When switch 17 closes it energizes the direct current relay 25 and simultaneously charges capacitor 21. Opening of switch 18 deenergizes solenoid 19 allowing spring 13 to again pull rod section 14b to the left to reset switch 18. Cycle will continue to repeat, thereby imparting a pulsating movement to rod 14 in a substantially horizontal plane. Relay 25 will remain energized throughout cycling due to supply of current from capacitor 21 during the short interval when switch 18 is open. Should the cycle be broken, relay 25 will be deenergized and, hence, affect the circuit connected to terminals 23.

As indicated, dashpot 20 is adjustable and, accordingly, cycling of the circuit can be regulated, such as to cause pulsations of the rod every 5 to 10 seconds, for example. During each cycle the front rod section 14a moves to the left and the back to its starting position. As the level of material 15 in the receptacle R reaches the height of rod 14 and surrounds it, the movement of rod 14 will be obstructed until such time as the level of material subsequently falls below the level of the rod permitting it to move again. When movement of rod 14 is stopped due to the presence of material surrounding it, switch 17 or 18 will remain open allowing relay 25 to deenergize (after capacitor 21 dissipates its charge) thereby, as indicated, activating the control circuit connected to terminals 23 which, in turn, will stop the mechanism conveying material 15 to receptacle R. With the level control device circuit still connected to a power source, a decrease in the level of material 15 below the height of rod 14 will cause it to again pulsate and allow reactivation of the circuit connected to terminals 23, thereby permitting further conveyance of material 15 to the receptacle R.

Operation of the embodiment of FIGS. 4 and 5 is the same as described above, as far as movement of the rod or probe and resulting control of the external circuit are concerned. However, the means for controlling the rod, as indicated, are primarily electrical and the mechanical dashpot is eliminated with its function accomplished by electrical components.

When the circuit of FIG. 5 is activated by a source of power, current will initially flow through a circuit including switch 46, rectifier 56, resistance 57 and resistance 58, switch 46 having its starting position as shown in FIG. 5 with movable contact c against terminal a. Current flowing through the resistance 58 causes a voltage difference between the cathode and gate of the SCR rectifier 59, thereby permitting current to flow through the DC solenoid 43, which results in activating armature 42. Movement of armature 42 in turn causes rod 41 to move in the same manner as previously described and against the action of spring 44. Concurrently, movement of armature 42 causes movable contact c of switch 46 to withdraw from terminal a and to contact terminal b. The latter action closes the circuit to coil winding 51 of relay 50 breaking the circuit through terminal a. At this time capacitor 53 is also charged.

However, when switch 46 is reversed as just described, capacitor 55 will be charged which will permit current to continue to flow through the circuit and resistance 58. After a predetermined interval, depending upon the ratings of the elements employed, capacitor 55 will become fully charged, whereupon current will cease to flow in the circuit containing the rectifier 56 and the resistances 57 and 58. A time interval of about 8 seconds has been found preferable for certain commercial embodiments.

Upon cessation of the current flowing through the circuit containing resistance 58, silicon rectifier 59 stops conducting and solenoid 43 deenergizes thereby releasing armature 42. Spring 44 will return the rod 41 to its initial position and switch 46 will be reset with movable contact c touching terminal a, thereby permitting current to flow in the circuit of rectifier 56 and the resistances 57 and 58.

When switch 46 is reset as described, discharge of capacitor 53 will maintain relay 50 in the desired energized position and capacitor 55 will discharge through the switch. Relay 50 will remain in the desired position until the circuit is interrupted for longer than the aforementioned predetermined interval by obstruction of movement of the rod 41 due to presence of granular material. Upon discharge of capacitor 53 and, correspondingly, no further activation of coil winding 51, the external circuit connected to terminals 52 will be energized.

As will be understood, the presently described device can be adapted for controlling the level of a variety of finely divided or granular solid materials of relatively wide particle size. By reason of its construction, control is not lost by occasional lumps of material striking the rod 14. Also, there is a minimum of moving parts incorporated other than those associated with the electrical components.

I claim:

1. In an apparatus responsive to the presence or absence of finely divided material at a given level in a vessel comprising in combination:
    a. an elongated rod adapted for pulsation about an intermediate pivot point when unobstructed by said material;
    b. a solenoid having a reciprocal armature, said armature being associated with one end of said rod to impart pulsatory movement thereto about said pivot point;
    c. a switch for controlling the supply of current to the solenoid, said switch being opened and closed by the movement of said armature to alternately activate and deactivate said solenoid and correspondingly permit reciprocal movement of said armature;
    d. a relay adapted for controlling an external circuit related to said level;
    e. means for activating said relay upon pulsation of said elongated rod;
    f. means for maintaining said relay in an activated position while the elongated rod is subject to pulsation; and
    g. means for deactivating said relay upon cessation of pulsation of said rod.

2. An apparatus as described in claim 1, wherein said first named means includes a secured switch activated by said armature.

3. An apparatus as described in claim 2 wherein said second-named means includes a capacitor disposed in parallel with said relay.

4. An apparatus as described in claim 3 including means for limiting the frequency of pulsation of the elongated rod.

5. An apparatus as described in claim 2 which includes a capacitor disposed in parallel with said switch for maintaining said solenoid in activated position for a predetermined interval after said switch is opened.